(12) United States Patent
Ott

(10) Patent No.: US 7,036,517 B2
(45) Date of Patent: May 2, 2006

(54) APPLICATOR FOR REPLACEMENT HAIR STRANDS

(75) Inventor: Gerhard Ott, Graz (AT)

(73) Assignee: BEGE Privatstiftung, Graz (AT)

( * ) Notice: Subject to any disclaimer, the term of this patent is extended or adjusted under 35 U.S.C. 154(b) by 0 days.

(21) Appl. No.: 10/397,965

(22) Filed: Mar. 26, 2003

(65) Prior Publication Data

US 2004/0103910 A1    Jun. 3, 2004

(30) Foreign Application Priority Data

Nov. 29, 2002  (AT)  .............................. A 1795/2002
Dec. 23, 2002  (AT)  .............................. A 1928/2002

(51) Int. Cl.
*A41G 5/00*  (2006.01)

(52) U.S. Cl. ........................................................ 132/56

(58) Field of Classification Search ................ 132/201, 132/53, 54, 56, 224, 225, 271; 219/222, 219/225, 227, 228, 229, 535; 403/273, 274; 156/73.2, 158
See application file for complete search history.

(56) References Cited

U.S. PATENT DOCUMENTS

| | | | | |
|---|---|---|---|---|
| 1,040,662 A * | 10/1912 | Gallison | ...................... | 156/166 |
| 1,455,696 A * | 5/1923 | Wright | ........................ | 132/224 |
| 3,184,354 A * | 5/1965 | Strother | ..................... | 156/73.2 |
| 3,412,233 A * | 11/1968 | Wilkie | ......................... | 219/230 |
| 3,642,010 A * | 2/1972 | Kuris | .......................... | 132/201 |
| 3,865,662 A * | 2/1975 | Segal | ........................... | 156/94 |
| 3,980,861 A * | 9/1976 | Fukunaga | .................... | 219/230 |
| 4,075,046 A * | 2/1978 | MacDonald | ................ | 156/73.1 |
| 4,372,330 A * | 2/1983 | Nelson | .......................... | 132/53 |
| 4,610,481 A * | 9/1986 | Steinebrunner | .............. | 300/21 |
| 4,662,068 A * | 5/1987 | Polonsky | ....................... | 30/124 |
| 4,982,748 A * | 1/1991 | Trimarchi | .................... | 132/201 |
| 5,072,745 A * | 12/1991 | Cheh | ............................ | 132/201 |
| 5,107,867 A * | 4/1992 | Barrington | ................... | 132/201 |
| 5,769,100 A * | 6/1998 | Alexander | ................... | 132/271 |
| 5,793,018 A * | 8/1998 | Jett | .............................. | 219/225 |
| 5,861,607 A * | 1/1999 | Jarrett | .......................... | 219/225 |
| 5,894,846 A * | 4/1999 | Gang | ............................ | 132/201 |
| 6,109,274 A * | 8/2000 | Ingersoll | ...................... | 132/201 |
| 6,247,236 B1* | 6/2001 | Johnson | ......................... | 30/140 |
| 6,279,303 B1* | 8/2001 | Sloan | ................................ | 54/1 |
| 6,510,856 B1* | 1/2003 | Ahn | ............................. | 132/219 |
| 2002/0185146 A1* | 12/2002 | Gold | ............................ | 132/201 |
| 2004/0011372 A1* | 1/2004 | Park | ............................. | 132/201 |

* cited by examiner

*Primary Examiner*—Eduardo C. Robert
*Assistant Examiner*—David Comstock
(74) *Attorney, Agent, or Firm*—Friedrich Kueffner

(57) ABSTRACT

An applicator for replacement hair strands, having hair embedded with one end in a U-shaped thermoplastic element, has a matrix having a recess for receiving the U-shaped thermoplastic element of the replacement hair strand. The applicator also has a stamp movable into the recess of the matrix. An actuating and heating device is provided into which the stamp and the matrix are inserted. The recess of the matrix is penetrated by a channel extending transversely to the movement direction of the stamp. The channel receives a magazine provided with receiving and storing spaces for replacement hair strands. The actuating and heating device has a step-by-step advancing device for the magazine.

1 Claim, 4 Drawing Sheets

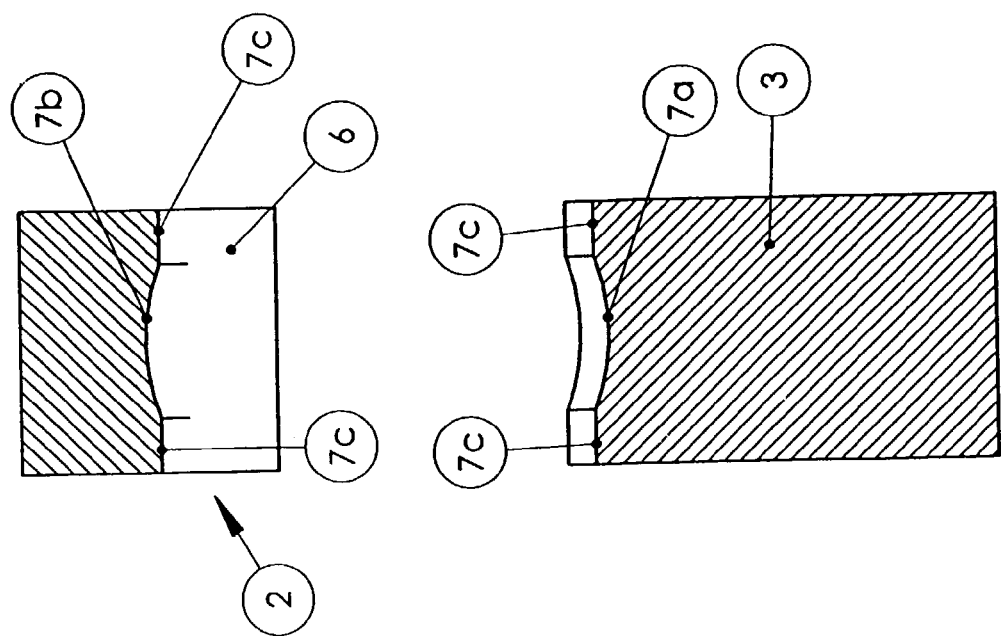
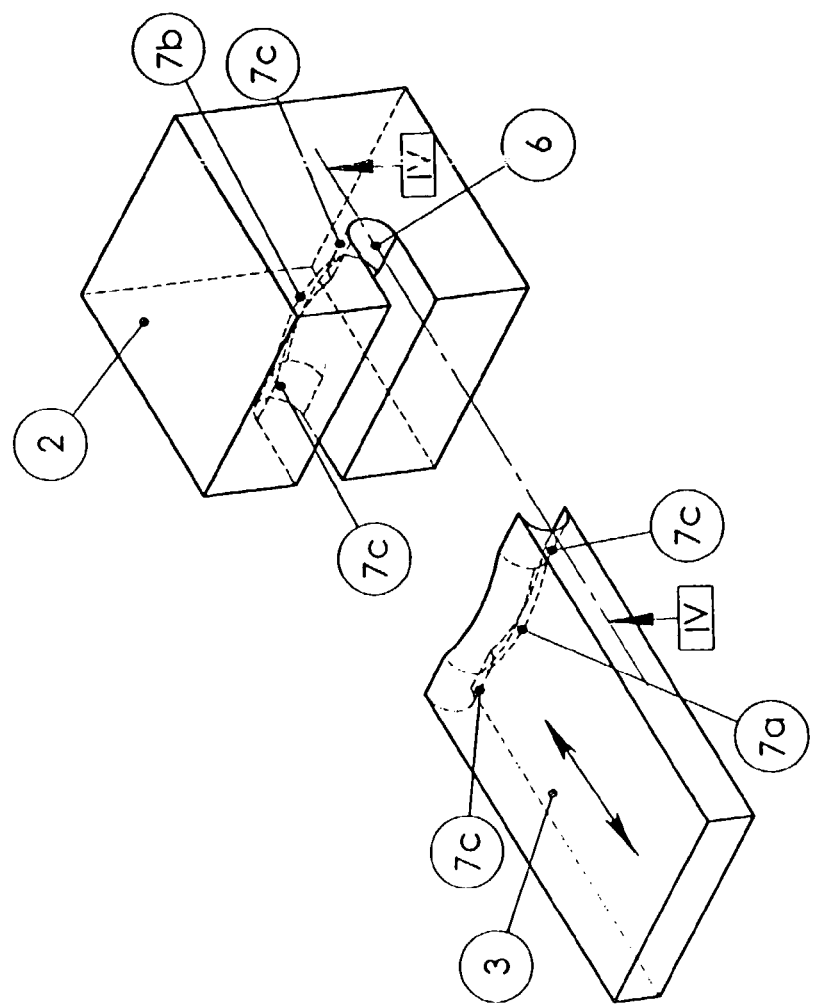
Fig. 4
Fig. 3

_US 7,036,517 B2_

APPLICATOR FOR REPLACEMENT HAIR STRANDS

BACKGROUND OF THE INVENTION

1. Field of the Invention

The invention relates to an applicator for replacement hair strands having hair embedded with one end in a U-shaped thermoplastic element.

2. Description of the Related Art

Replacement hair strands are conventionally held together by a thermoplastic element in the shape of a U or a V wherein a stay of the U-shape connecting the legs is straight or bent. When attaching the replacement hair strands on the human head, a strand of the person's own hair is placed between the legs of the U-shape or the V-shape of the thermoplastic element, subsequently the U-shaped or V-shaped thermoplastic elements are heated by ultrasound or by means of heating tweezers until the thermoplastic material is softened or melts. For completing this hot melt connection, usually the hot melt area at the beginning of solidification of the hot melt is rolled or folded between the fingers in order to ensure excellent embedding of the own hair and the replacement hair in the hot melt adhesive. However, this method depends greatly on the skill of the hairdresser; often, the hot melt connection is incomplete so that the replacement hair strands become detached from the person's own hair after a few combing strokes.

SUMMARY OF THE INVENTION

It is an object of the present invention to provide an applicator which ensures safe connection of foreign hair and own hair without this requiring special skills from the technician applying the foreign hair.

In accordance with the present invention, this object is met by providing the applicator with a matrix having a recess for receiving the U-shaped element as well as a plunger or a stamp which is moveable into the receptacle of the matrix and guided along its stroke.

By means of the applicator comprising a stamp or plunger and a matrix, the U-shaped element in the end is deformed such that it adopts the shape of a compact elongate body in which the replacement hair as well as the own hair are embedded entirely with their ends. During the course of placing the ends of the own hair into the U-shaped element, the applicator is placed on top so that the U-shaped element comes to lie in the recess of the matrix. Subsequently, the stamp is pushed into the recess of the matrix so that, with or without heating, plastic deforming and compacting of the thermoplastic element result. Of course, only a relative movement between the stamp and the matrix is important in this context, i.e., alternatively, the matrix can be forced against the stamp or plunger.

It is beneficial when the recess and the stamp have possibly different profiles and the stamp, upon complete insertion into the recess, defines a free space which is substantially prism-shaped. After application of the foreign hair strand to a strand of own hair the thermoplastic connection has adopted substantially a prism-shaped form.

In the case that the profiles of the stamp and of the base of the recess are straight or planar, a rectangular prism shape results for the thermoplastic connection. In the case of a curved profile, on the other hand, a cylindrical shape with circular or oval cross-section results for the thermoplastic connection. The profiles of the stamp and of the base of the recess can be different, for example, planar for one and curved for the other. In some situations, it was found to be beneficial to design one or both of the profiles to have an undulated or zigzag shape. Decisive for the selection of the profiles is primarily the desired appearance (which actually is invisible to an onlooker) of the connection with regard to the desired hairdo.

It was found to be advantageous when the recess and the stamp have substantially mirror-symmetrical profiles which have a concave curvature in the movement direction of the stamp as well as transverse thereto. The thermoplastic connection between the foreign hair and the own hair has then substantially the shape of a curved cylinder with circular or oval cross-section. This shape has the result that the original U-shaped element is pinched off and deformed more at its ends than at its center so that a more intensive enveloping of the hair by the thermoplastic material results during the hot melting and pressing process in comparison to a substantially prism-shaped or cylindrical hot melt connection. It was found to be beneficial in this connection when the concave curvature extending transversely to the movement direction of the stamp has sections at its edges that extend substantially perpendicularly to the movement direction of the stamp. With this profile, the completed hot melt connection encloses the ends of the foreign hair and own hair in their longitudinal direction and has at its center a bulging thickened portion. This shape of the connection is therefore hardly visible even when looking carefully if, as is conventional, a transparent thermoplastic material is used.

An especially simple and thus advantageous configuration of the applicator resides in that the matrix substantially has the shape of a hook having a long and a short leg wherein the recess is provided in the short leg and the stamp is guided along the side of the long leg facing the short leg.

Finally, it is expedient when the stamp and the matrix can be inserted into an actuating and heating device so that conventional relevant (universal) tools can be used.

In order to ensure a substantially automated and thus quick application of replacement hair strands on the human head, it is advantageous when the recess of the matrix is penetrated by a channel extending transversely to the movement direction of the stamp and when a magazine can be inserted into the channel which magazine has several receiving and storing means for replacement hair strands positioned adjacent to one another and having a shape matching the shape of the recess.

In this configuration, the magazine can be filled with several replacement hair strands: they are placed with their U-shaped elements into the receiving and storing means. A successive movement of the magazine then moves each one of the storage means into an aligned position relative to the recess of the matrix in which the connection of the respective replacement hair strand with the previously inserted own hair is realized upon insertion of the stamp. The respective receiving and storing means thus takes on, entirely or partially, the function of the recess, i.e., the plastic deformation of the U-shaped thermoplastic elements is carried out, entirely or partially, directly in the receiving and storing means. It is therefore expedient in connection with the invention when the actuating and heating device is provided with a step-by-step advancing device for the magazine.

BRIEF DESCRIPTION OF THE DRAWING

In the drawing:

FIG. 3 shows a detail of FIG. 1 with a modification of the invention;

FIG. 4 shows a section along the line IV—IV of FIG. 3;

DESCRIPTION OF THE PREFERRED EMBODIMENTS

Figure 1:
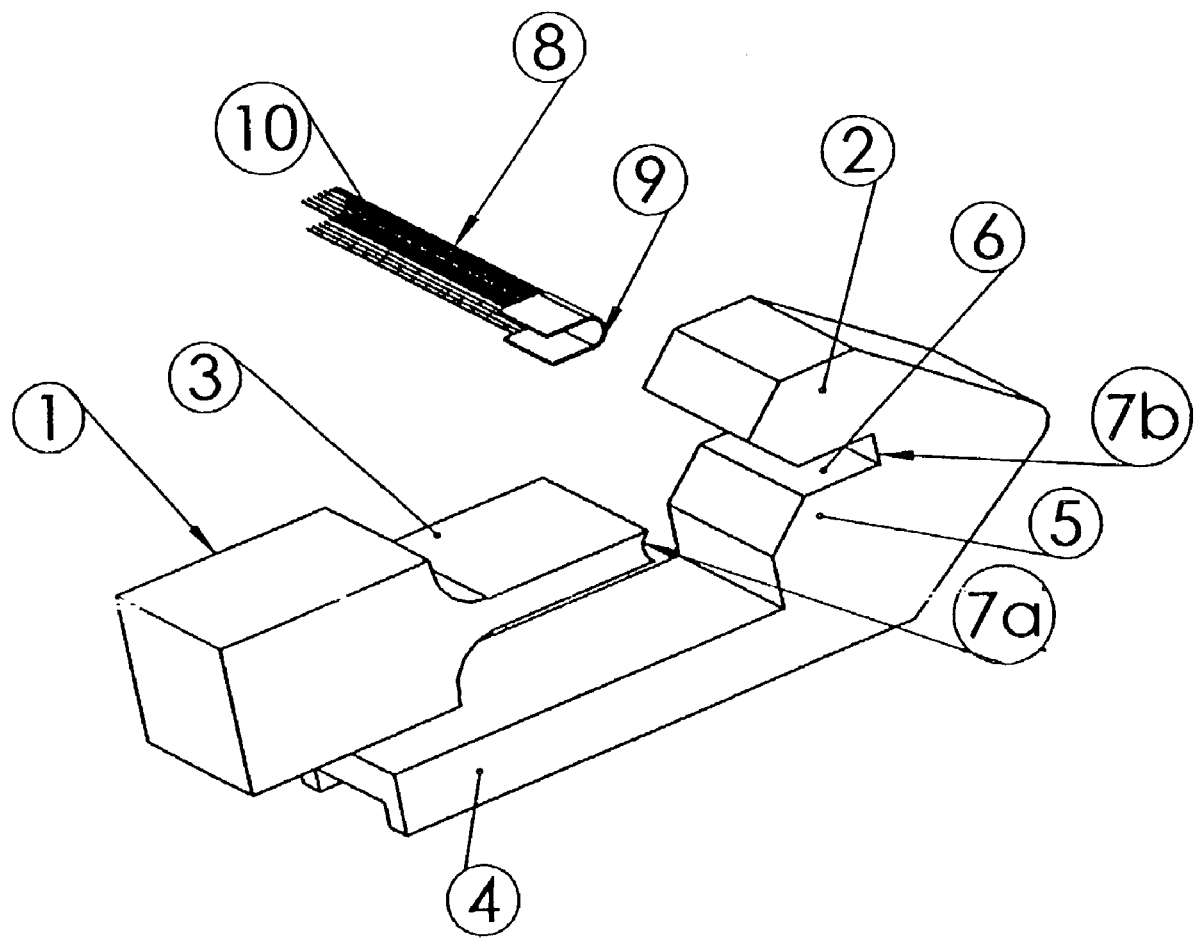
FIG. 1 shows in a schematic perspective view an applicator according to the invention in the open position.
Figure 2:
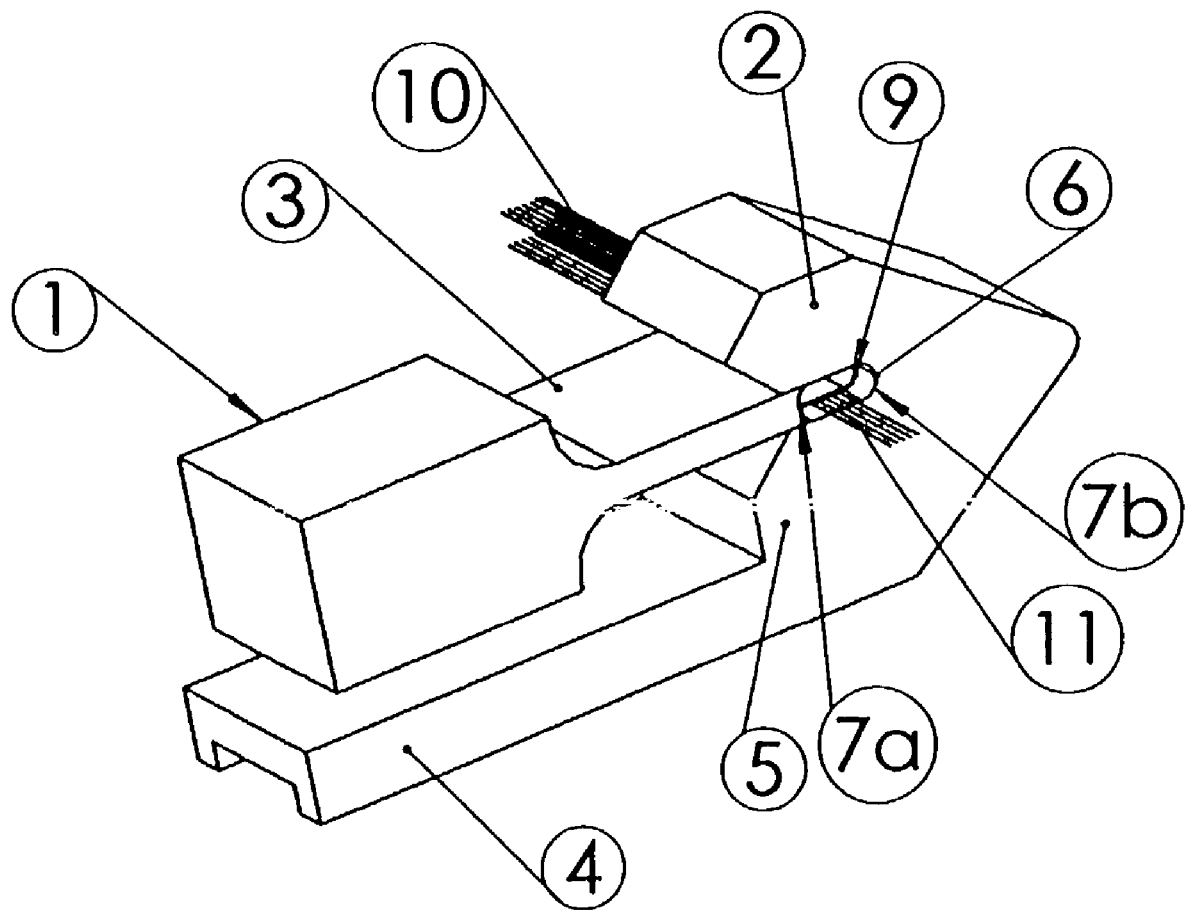
FIG. 2 shows the applicator of FIG. 1 in the closed position.

The applicator 1 (FIGS. 1 and 2) according to the invention is comprised of a matrix 2 and a stamp 3. The matrix has substantially the shape of a hook with a long leg 4 and a short leg 5. In the short leg 5 a groove-shaped recess 6 is provided. The stamp 3 is guided along a side of the long leg 4 facing the short leg 5. The stamp 3 and the base of the groove-shaped recess 6 can be provided with any suitable profile 7a, 7b. In the embodiment illustrated in FIG. 1, the profile 7a of the stamp 3 is curved while the profile 7b of the base of the recess 6 is planar. In FIG. 2, the two profiles 7a, 7b are both curved.

A replacement hair strand 8 has a U-shaped thermoplastic element 9 in which the ends of the foreign hair 10 are embedded. The U-shape is illustrated with a curved stay connecting the two legs. However, a straight stay is also possible. For the application of the replacement hair strand 8 on a strand of own hair 11, the ends of the own hair strand 11 are inserted into the U-shaped element 9; subsequently, the matrix with its recess 6 is placed onto the element 9 and the stamp 3 is inserted into the recess 6 of the matrix. With or without heating the applicator, a plastic deformation of the element 9 results so that a hot melt connection is realized between the foreign hair 10 and the own hair 11. The applicator comprised of stamp 3 and matrix 2 can be inserted expediently into a corresponding heating and actuating device 12 (FIG. 5).

In the embodiment of the invention as illustrated in FIGS. 3 and 4, the recess 6 of the matrix 2 and the stamp 3 have substantially mirror-symmetrical profiles 7a and 7b which are concavely curved in the movement direction of the stamp (see arrow) or the direction of the relative movement of stamp 3 and matrix 2 as well as transversely thereto. The transversely extending concave curvature passes into sections 7c at the lateral edges which are approximately perpendicular to the movement direction. The connection resulting after completion of the pressing and melting process between the foreign hair 10 (FIGS. 1 and 2) and the own hair 11 (FIG. 1) has then approximately the shape of a bulging cylinder; this was found to be especially beneficial with regard to appearance as well as quality of the hot melt connection.

Figure 5:
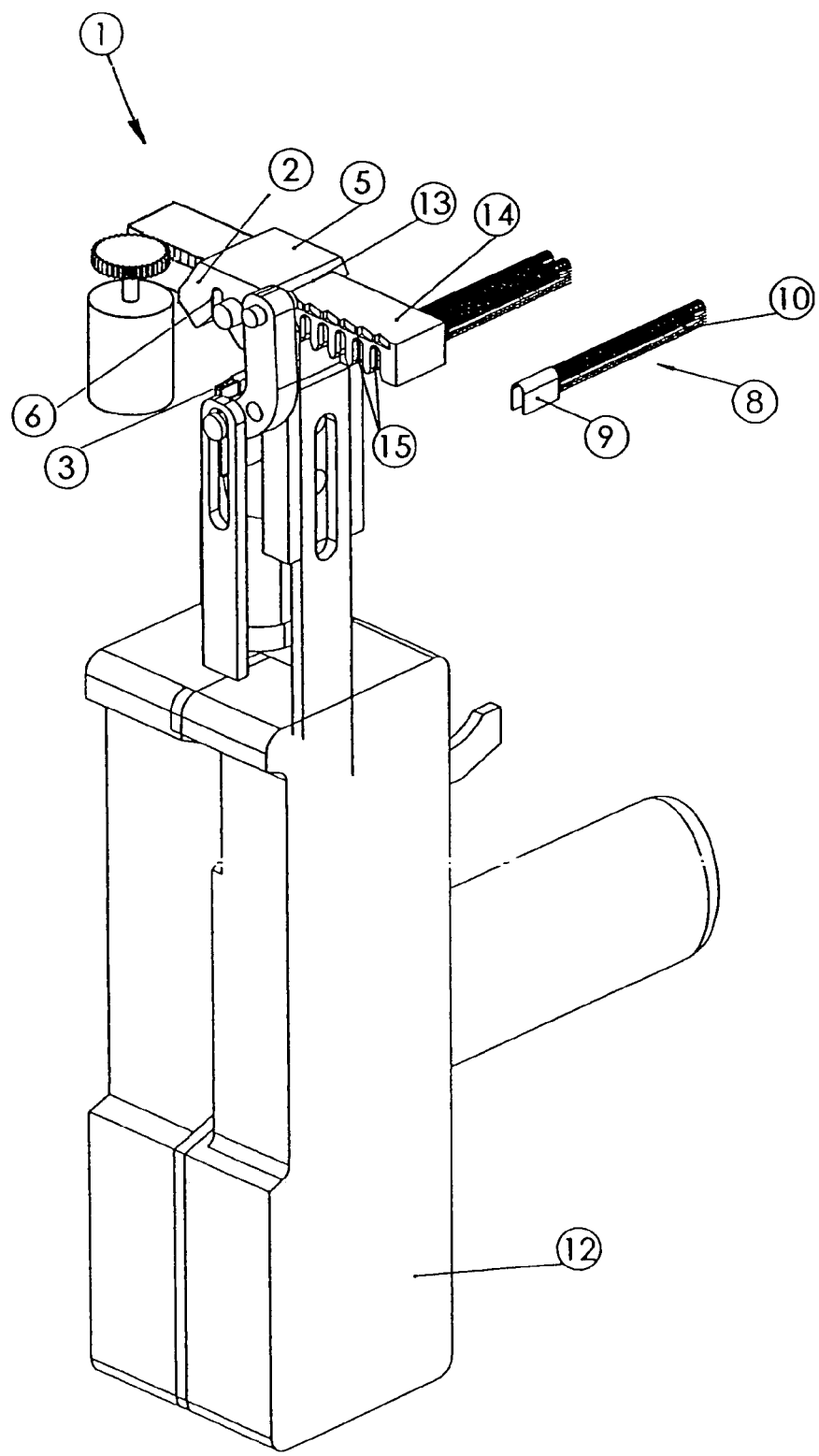
FIG. 5 shows a schematic perspective view of another embodiment of the applicator according to the invention together with the actuating and heating device.

In the embodiment of the applicator 1 illustrated in FIG. 5 and inserted into an actuating and heating device 12, the recess 6 of the matrix 2 is penetrated by a channel 13 extending transversely to the movement direction of the stamp 3. A magazine 14 can be inserted into this channel 13. It is provided with several (for example, 10) adjacently positioned receiving and storing means or spaces 15 which have a shape matching the shape of the recess 6. The replacement hair strands 8 with their U-shaped elements 9 are inserted into these spaces 15. The actuating and heating device 12 can be provided with a step-by-step advancing device schematically shown in FIG. 5.

When employing the applicator according to FIG. 3, first the magazine 14 is provided with foreign hair strands 8 and subsequently inserted into the channel 13. With successive advancing of the magazine 14, these receiving and storing spaces 15 with the inserted elements 9 reach the recess 6 and simultaneously take over its function partially or entirely. In this position, a strand of own hair 11 is placed into the open U of the element 9 and, subsequently, the stamp 3 or the matrix 2 is activated so that a relative movement between them results causing a melt connection between the foreign hair and own hair. After removal of the thermoplastic prism-shaped or cylinder-shaped connection from the recess 6 of the matrix 2 or from the receiving and storing means or space 15 of the magazine 14, the magazine 14 is moved to the next receiving and storing means 15 so that the next hot melt connection can be realized.

While specific embodiments of the invention have been shown and described in detail to illustrate the inventive principles, it will be understood that the invention may be embodied otherwise without departing from such principles.

What is claimed is:

1. An applicator for replacement hair strands having hair embedded with one end in a U-shaped thermoplastic element, the applicator comprising:

a matrix having a recess for receiving a U-shaped thermoplastic element of a replacement hair strand;

a stamp movable into the recess of the matrix, wherein the recess of the matrix is penetrated by a channel extending transversely to a movement direction of the stamp, wherein the channel is configured to receive a magazine provided with receiving and storing spaces for replacement hair strands, wherein the receiving and storing spaces have a shape matching a shape of the recess, wherein the matrix has substantially a shape of a hook with a long leg and a short leg, wherein the recess is provided in the short leg and wherein the stamp is guided along a side of the long leg facing the shorter leg.

* * * * *